(12) United States Patent
Kreher et al.

(10) Patent No.: US 9,485,679 B2
(45) Date of Patent: Nov. 1, 2016

(54) APPARATUS AND METHOD FOR ANALYZING THE QUALITY OF A CELL IN A MOBILE DEVICE NETWORK

(71) Applicant: Tektronix, Inc., Plano, TX (US)

(72) Inventors: Ralf Kreher, Berlin (DE); Martin Polak, Berlin (DE); Martin Winau, Berlin (DE); Robert William Froehlich, McKinney, TX (US)

(73) Assignee: NSRS COMMS IRELAND LIMITED, Blackrock (IE)

( * ) Notice: Subject to any disclaimer, the term of this patent is extended or adjusted under 35 U.S.C. 154(b) by 242 days.

(21) Appl. No.: 13/921,527

(22) Filed: Jun. 19, 2013

(65) Prior Publication Data

US 2014/0376390 A1     Dec. 25, 2014

(51) Int. Cl.
*H04W 24/08*    (2009.01)
*H04W 24/04*    (2009.01)

(52) U.S. Cl.
CPC ............. *H04W 24/08* (2013.01); *H04W 24/04* (2013.01)

(58) Field of Classification Search
None
See application file for complete search history.

(56) References Cited

U.S. PATENT DOCUMENTS

| | | | |
|---|---|---|---|
| 9,020,536 B1* | 4/2015 | Crossno | G06Q 10/0833 455/456.1 |
| 2006/0019679 A1* | 1/2006 | Rappaport | H04W 64/00 455/456.5 |
| 2011/0191465 A1* | 8/2011 | Hofstaedter et al. | 709/224 |
| 2012/0155428 A1* | 6/2012 | Bovo | H04L 43/18 370/331 |
| 2012/0315917 A1* | 12/2012 | Comeau et al. | 455/456.1 |
| 2014/0036786 A1* | 2/2014 | Kazmi et al. | 370/329 |
| 2014/0080503 A1* | 3/2014 | Issakov | H04W 24/00 455/456.1 |

* cited by examiner

*Primary Examiner* — Christopher Crutchfield
*Assistant Examiner* — Tito Pham
(74) *Attorney, Agent, or Firm* — Locke Lord LLP; Scott D. Wofsy; Christopher J. Capelli (57) ABSTRACT

A method for analyzing a mobile radio network including the steps of collecting traffic data from call monitoring equipment connected to the mobile radio network, collecting signaling data from network monitoring equipment connected to the mobile radio network, correlating the traffic data and the signaling data related to a cell of the mobile radio network. and creating a graphical display of the correlated traffic data and the signaling data.

10 Claims, 6 Drawing Sheets

APPARATUS AND METHOD FOR ANALYZING THE QUALITY OF A CELL IN A MOBILE DEVICE NETWORK

BACKGROUND OF THE INVENTION

1. Field of the Invention

The subject disclosure relates to methods and apparatus for analyzing the quality of a cell in a mobile device network, and more particularly to improved methods and apparatuses for presenting a graphical display illustrating the Quality of Service in the cell to facilitate improving cell performance in a Long Term Evolution (LTE) network.

2. Background of the Related Art

In mobile radio networks, the network provider is concerned with optimizing the performance of the radio network. Poor performance and inefficiency result from congestion, inadequate coverage and the like. Networks such as 4G/Long Term Evolution (LTE) networks have used older pre-existing techniques to optimize the radio network.

Radio Access Networks (RAN) utilize the control plane to carry signaling traffic. The handset and RAN can address some issues such as utilizing Voice over Internet Protocol (VoIP) and providing a large bandwidth when needed but based on the signaling information of the control plane, it is not possible to manage the associated resources. For example, monitoring the handset and RAN signaling information provides no insight as to the Quality of Service (QoS), which creates an information gap.

For another example, drive testing is a typical method of measuring and assessing the coverage, capacity and QoS of a mobile radio network. Drive testing consists of using a motor vehicle containing mobile radio network air interface measurement equipment that can detect and record a wide variety of the physical and virtual parameters of mobile cellular service in a given geographical area. The drive test equipment is usually highly specialized electronic devices that interface to OEM mobile handsets. By drive test measuring what a wireless network subscriber would experience in any specific area, wireless carriers can make directed changes to their networks that provide better coverage and service to their customers.

A great deal of data can be collected during drive testing. Drive test equipment typically collects data relating to the network itself, services running on the network such as voice or data services, radio frequency scanner information and GPS information to provide location logging. The dataset collected during drive testing field measurements can include information such as: signal intensity; signal quality; interference; dropped calls; blocked calls; anomalous events; call statistics; service level statistics; QoS information; handover information; neighbouring cell information; GPS location co-ordinates; and the like. Drive testing can focus on network optimization and troubleshooting or service quality monitoring. For example, quality monitoring focuses on the end user experience of the service, and allows mobile network operators to react to what effectively subjective quality degradations by investigating the technical cause of the problem in time-correlated data collected during the drive test. Service quality monitoring is typically carried out in an automated fashion, using devices that run largely without human intervention carried in the drive test vehicles.

Drive testing is a costly, tediously slow, and inexact method to assess a mobile radio network. Further, drive testing is not statistically relevant to large volumes and real life activity. Still further, drive testing is not representative of user behavior as users are often off-road be it indoors or out, running new applications, creating non-deterministic events and the like. In addition to drive testing, network operators can rely on Operations Support Systems (OSS). OSS provides aggregated and averaged counters on a cell basis only. As such, OSS counter information is not helpful regarding visibility on quality distribution within cells or perceived quality by network users.

SUMMARY OF THE INVENTION

In view of the above, what is needed is technology to overcome the information gap created by using the control plane signaling data to optimize mobile radio networks. The current techniques for optimizing mobile radio networks lack visibility and/or statistical relevance. What is needed is evaluation for the cell that is realistic and highly granular. As a result, equipment may be adjusted, such as the antenna and power parameters, to more effectively optimize the mobile radio network performance.

In a 4G/Long Term Evolution (LTE) network, User Equipment (UE) communicates with enhanced Node B (eNodeB) network entities. The eNodeBs are controlled by Mobility Management Entities (MME). When a UE attaches to the LTE, information about the user activity or traffic occurs, which generates user traffic data. Additionally, telecommunications signaling occurs that is the transmission of data for purposes of sharing information for network control and/or call control, which generates control plane signaling data. Network monitoring equipment or probes capture the user traffic data and the control plane signaling data. An example of a probe is the GeoProbe G10 platform, including the Iris Analyzer Toolset applications from Tektronix Incorporated.

The present technology utilizes geolocation methodologies to determine the location of individual radio transactions with significant granularity to correlate QoS and experience information observed in the interface of the core network (i.e., the user traffic data) with control plane signaling data. The correlated results may be displayed as a map of the associated cell with color variations to illustrate specific or aggregated quality parameters. The correlated results may also be displayed as a scatter diagram as a function of various parameters. Thus, the network operators and providers may adjust antenna and power parameters to optimize the performance of the mobile radio network based on the correlated results.

In one embodiment, the subject technology is directed to a method for analyzing a mobile radio network comprising the steps of: collecting user plane traffic data from call monitoring equipment connected to the mobile radio network; collecting control plane signaling data from network monitoring equipment connected to the mobile radio network; and correlating the user plane traffic data and the control plane signaling data related to a cell of the mobile radio network. Another embodiment is further operative to create a graphical display of the correlated user plane traffic data and the control plane signaling data.

Preferably, the graphical display is a heated tile map of the cell illustrating Quality of Service (QoS) for a plurality of tiles in the cell or a plurality of heated tile maps illustrating parameters selected from the group consisting of accessibility, QoS, retainability and combinations thereof. The method may also optimize performance within the cell based upon the graphical display by adjusting antenna and power parameters. The graphical display may illustrate profitability of the cell. The mobile radio network may be a Long Term Evolution (LTE) network. The user plane traffic data may be individual call data that has been aggregated based on geolocation.

Another embodiment of the subject technology is directed to a cell network monitoring system coupled to a mobile radio network having at least one cell comprising: a monitoring system for: receiving user plane traffic data from call monitoring equipment connected to the mobile radio network; receiving control plane signaling data from network monitoring equipment connected to the mobile radio network; and correlating the user plane traffic data and the control plane signaling data related to a cell of the mobile radio network. The monitoring system may be further operative to create a graphical display of the correlated user plane traffic data and the control plane signaling data with a user interface station for presenting the graphical display, and persistent memory for storing the user plane traffic data and the control plane signaling data.

In the cell network monitoring system, the graphical display may be a heated tile map of the cell illustrating Quality of Service (QoS) for a plurality of tiles in the cell. The graphical display can also illustrate parameters selected from the group consisting of accessibility, QoS, retainability, profitability, call density and combinations thereof. Adjustment equipment can connect to the mobile radio network for optimizing performance within the at least one cell based upon the correlated user plane traffic and control plane signaling data.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed apparatus and method appertains will more readily understand how to make and use the same, reference may be had to the following drawings.

DETAILED DESCRIPTION OF PREFERRED EMBODIMENTS

The subject technology overcomes many of the prior art problems associated with the information gap of optimizing mobile radio networks using just the control plane signaling information. The advantages, and other features of the technology disclosed herein, will become more readily apparent to those having ordinary skill in the art from the following detailed description of certain preferred embodiments taken in conjunction with the drawings which set forth representative embodiments of the present invention.

Figure 1:
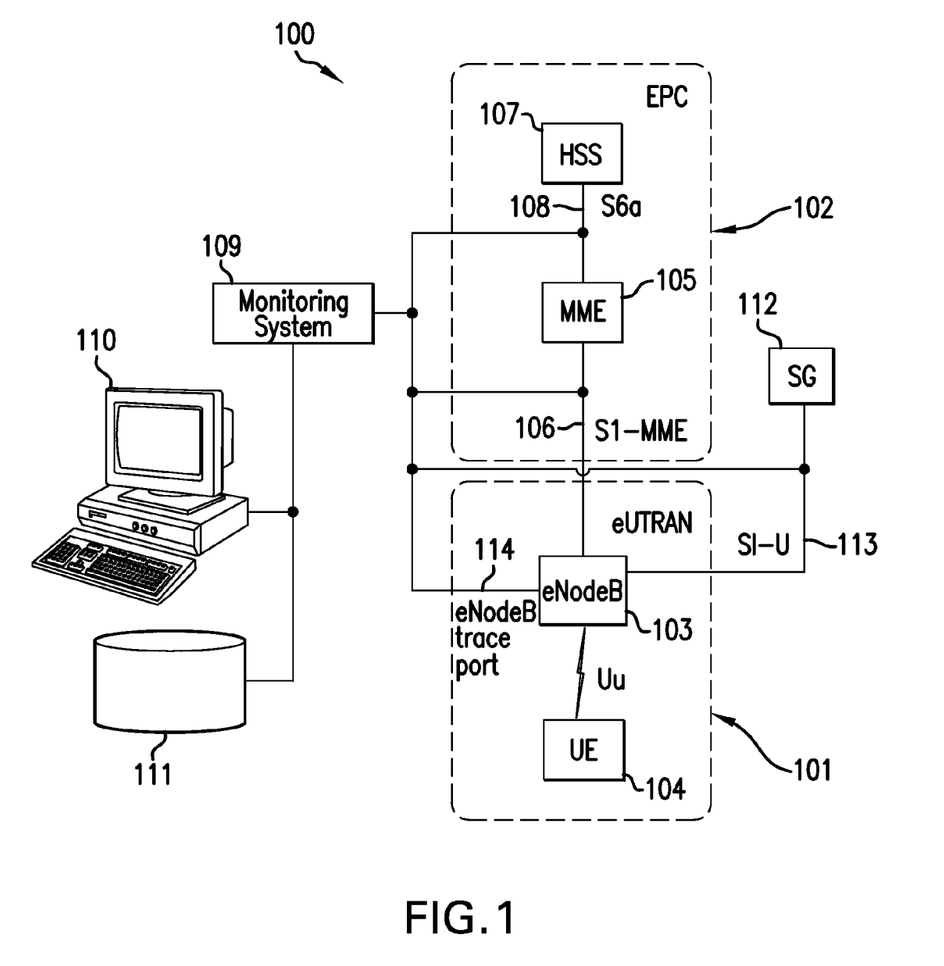
FIG. 1 is a block diagram showing an environment having a cell network optimization apparatus in accordance with the subject disclosure

Referring now to FIG. 1, a block diagram showing an environment having the elements of a Long Term Evolution (LTE) network 100 and the relationship between certain LTE elements is shown. The elements of an LTE network are well known to those of ordinary skill in the art such as shown and described in U.S. Patent PG Pub. No. 2012/0159151 published on Jun. 21, 2012 to Janakiraman et al, which is incorporated herein by reference in its entirety. It will be understood that for simplicity only a small portion of an LTE network 100 is illustrated in FIG. 1. The LTE network 100 comprises two major sections: the evolved UMTS Terrestrial Radio Access Network (eUTRAN) 101; and an all-IP Evolved Packet Core (EPC) 102. EUTRAN 101 and EPC 102 together are referred to as the Evolved Packet System (EPS). The LTE network 100 covers a large geographic area, which is subdivided into cells. Each cell may have a transceiver antenna or tower and base station (e.g., eUTRAN 101) at or near the center of each cell or a cell may even have multiple base stations depending upon the configuration.

eUTRAN 101 provides the air interface for LTE network 100 using a plurality of enhanced NodeB (eNodeB) base stations 103. The eNodeB 103 interfaces with User Equipment (UE) 104 and hosts the PHYsical (PHY), Medium Access Control (MAC), Radio Link Control (RLC), and Packet Data Convergence Protocol (PDCP) layers. eNodeB 103 also hosts Radio Resource Control (RRC) functionality corresponding to the control plane for radio resource management. eNodeB 103 performs radio resource management, ciphering/deciphering of user and control plane data on the Uu interface, and other functions. eNodeB 103 comprises transceiver components that communicate with the User Equipment (UE) 104 over the air interface Uu.

eNodeB 103 is coupled to one or more Mobility Management Entity (MME) 105 in the EPC via S1-MME interconnections 106. MME 105 controls the LTE access network 100 and is responsible for the UE 104 tracking and paging procedures. MME 105 is responsible for generation and allocation of temporary identities to the UE 104 and is part of the bearer activation/deactivation process. MME 105 is also responsible for authenticating the UE 104 by interacting with Home Subscriber Service (HSS) 107. MME 105 is linked to HSS 107 via the Sha interface 108. MME 105 is the termination point for ciphering/integrity protection for Non-Access Stratum (NAS) signaling and handles security key management.

eNodeB 103 is also coupled to a Serving Gateway (SG) 112 via a S1-U logical interface 113. The SG 112 routes and forwards user data packets, while also acting as the anchor for mobility between LTE and other 3GPP technologies among other things. The SG 112 manages and stores UE contexts, e.g. parameters of the IP bearer service, network internal routing information and the like. The user plane is transmitted over the S1-U logical interface, so as such, the S1-U logical interface 113 or another user plane core interface is monitored in order to obtain subscriber QoS data (i.e., the user traffic data or user plane traffic data). QoS is also sometimes referred to as Quality of Experience (QoE).

A monitoring system 109 is coupled to the eUTRAN 101, the EPC 102 and the SG 112 to passively monitor and collect data from one or more interfaces in the LTE network 100. The monitoring system 109 collects user plane data from the core interface (e.g., the S1-U logical interface 113) and control plane data from the EPC interfaces (e.g., the S1-MME 106 and Sha 108 interfaces). The monitoring system 109 also connects to the eNodeB 103 via the eNodeB trace port 114 for monitoring the LTE eUTRAN signaling information. The monitoring system 109 may comprise, in one embodiment, one or more processors running one or more software applications that collect, correlate and analyze Protocol Data Units (PDU) from the LTE network 100 such as in one or more probes. The monitoring system 109 may incorporate a protocol analyzer, session analyzer, and/or traffic analyzer functionality that provides OSI (Open Systems Interconnection) layer 2 to layer 7 troubleshooting by characterizing IP traffic by links, nodes, applications and servers on the LTE network 100. Such functionality is provided, for example, by a GeoProbe G10 platform, including the Iris Analyzer Toolset applications and Splprobes, from Tektronix Incorporated.

The monitoring system 109 may be coupling to network interfaces via packet capture devices, such as high-speed, high-density probes that are optimized to handle high bandwidth IP traffic. The monitoring system 109 passively captures message traffic from the interfaces without interrupting the network's operation. A service provider or network operator may access data from monitoring system 109 via user interface station 110. The monitoring system 109 may further comprise internal or external memory 111 for storing captured data packets, user session data, call records configuration information, and software application instructions. The monitoring system 109 may capture and correlate the packets associated specific data sessions on network interfaces. In one embodiment, related packets can be correlated using a 5-tuple association mechanism. The related packets can be combined into a record for a particular flow, session or call on the LTE network 100.

The monitoring system 109 may include one or more probes and other components. The probes may be passive probes that tap into the connections or interfaces using an optical or electrical splitter to mirror the data that is flowing between the network equipment without affecting the main data link. The captured data may be filtered, groomed and/or passed to a data acquisition processor, function or circuit in the monitoring system that analyzes the content of the captured data, such as identifying individual messages and parameters within the messages as necessary for the subject technology.

In an alternative embodiment, the monitoring system 109 may be an active component (e.g. software agent) that resides on an EPC node, such as on MME 103, for example, and that captures data packets passing into or out of the node. Control plane signaling data on the S1-MME interface 106 is available for use by monitoring system 109 to correlate with user traffic data on the SI-U interface 113 to create records as described below with respect to FIG. 2A and the like.

Figure 2:
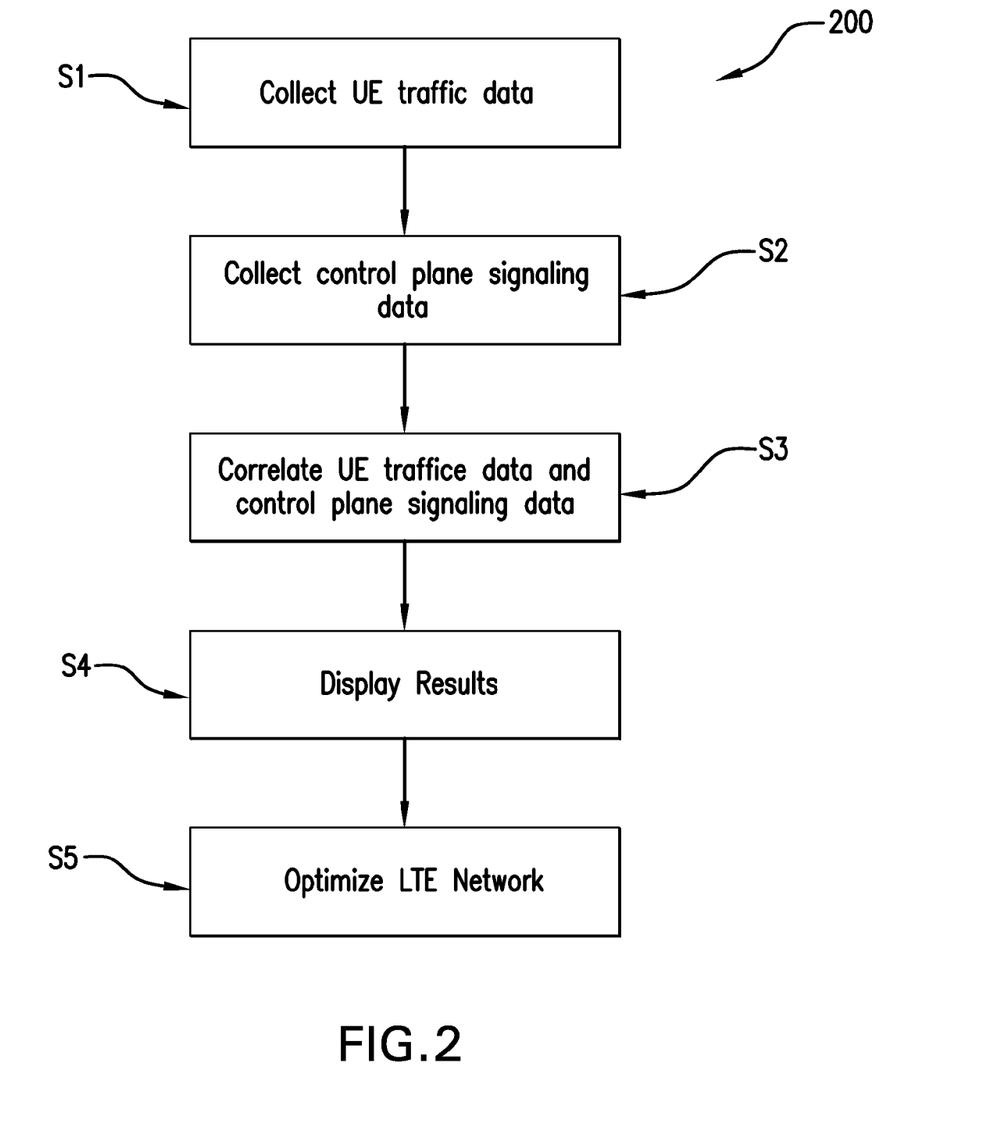
FIG. 2 is a flow diagram of a process performed by a cell network optimization apparatus in accordance with the subject disclosure.

Referring now to FIG. 2, a flow diagram of a process 200 performed by a cell network optimization apparatus in accordance with the subject disclosure is shown. The process 200 allows analyzing and, in turn, optimizing the performance of a cell in a mobile radio network. The flow diagram herein illustrates the structure or the logic of the present technology, possibly as embodied in computer program software for execution on a computer, digital processor or microprocessor. Those skilled in the art will appreciate that the flow diagram illustrates the structures of the computer program code elements, including logic circuits on an integrated circuit, that function according to the present technology. As such, the present technology may be practiced by machine components, such as a plurality of probes, that render the elements in a form that performs a sequence of function step(s) to accomplish and reap the advantages of the subject technology.

Figure 3:
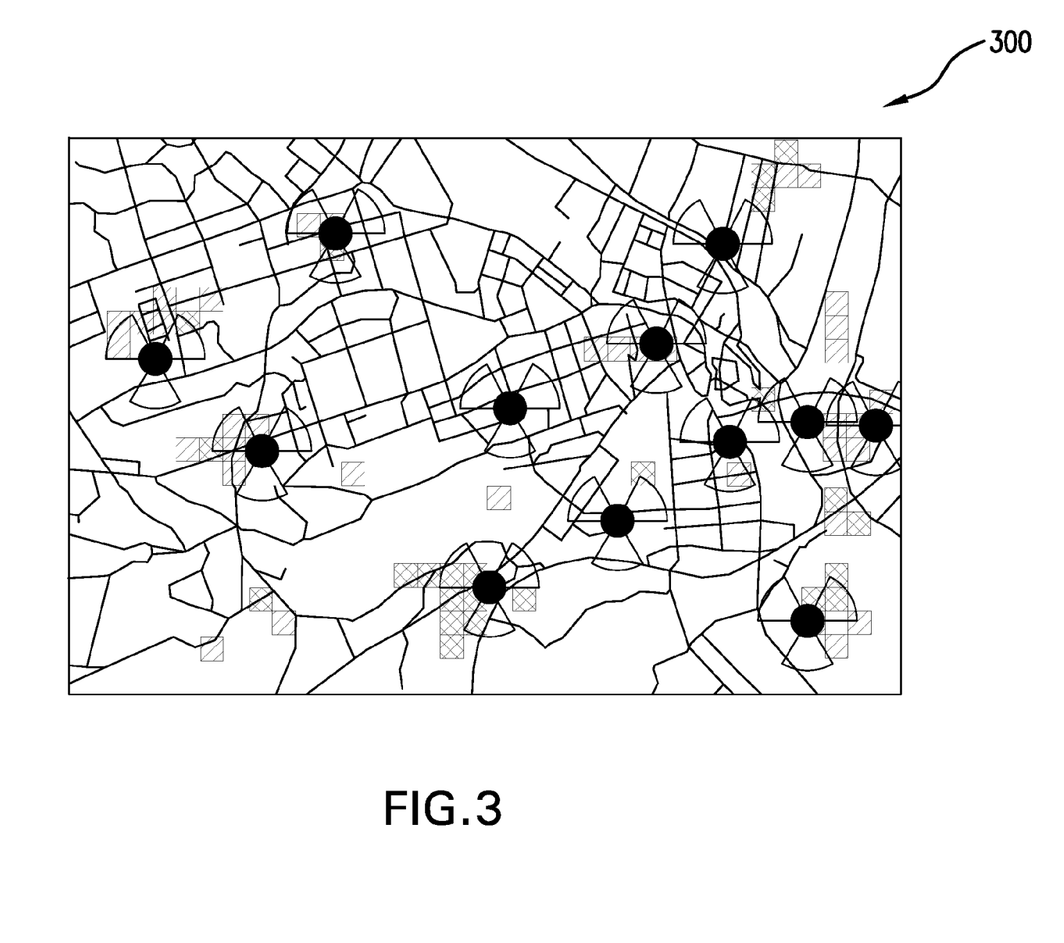
FIG. 3 is a street map of a cell in a mobile radio network in accordance with the subject disclosure.

At step S1, the monitoring system 109 collects data from the UE 104. The UE data or user plane traffic data includes geolocation information about where the associated user may be within a cell. Geolocation is preferably performed using algorithms applied on the radio measurements from the UE 104 with an accuracy of 150 m or better. An exemplary cell 300 is shown in FIG. 3. The cell 300 maybe any size or shape as configured by the operator of the LTE network 100 and/or as limited by the capability of the equipment. The UE data collected may include: Reference Signal Received Power (RSRP) of the serving and neighbor cells; Reference Signal Received Quality (RSRQ) of the serving and neighbor cells; Timing Advance (TA) from the serving cell or distance of the UE 104 from the antenna; type of radio bearer; QoS; experience data; and the like. In one embodiment, an OMC-R platform from Nokia Seimens Networks is utilized to support data collection.

In step S2, the monitoring system 109 also collects control plane signaling data from the LTE core network 100. The signaling and user plane data collected may include: user-perceived throughput; packet loss; packet delay and jitter; the subscriber's IDs (e.g. IMSI, IP address, IMEI, etc.); resource allocation parameters; user service quality; radio quality data on an individual radio transaction basis; resource allocation data on an individual radio transaction basis; and the like.

In step S3, the monitoring system 109 correlates the UE traffic data and the control plane signaling data. For example, radio quality and resource allocation data on an individual radio transaction is correlated with QoS and experience data. Geolocation methodology is utilized to geolocate the individual radio transactions in the cell 300. Preferably, the geolocation is accomplished with much higher granularity than the typical outdoor cell phone footprint. The data collected in steps S1, S2 and the data generated in step S3 may be stored in memory 111 for subsequent on demand retrieval and usage. Once the desired correlations are performed, the process 200 proceeds to step S4.

Figure 2A:
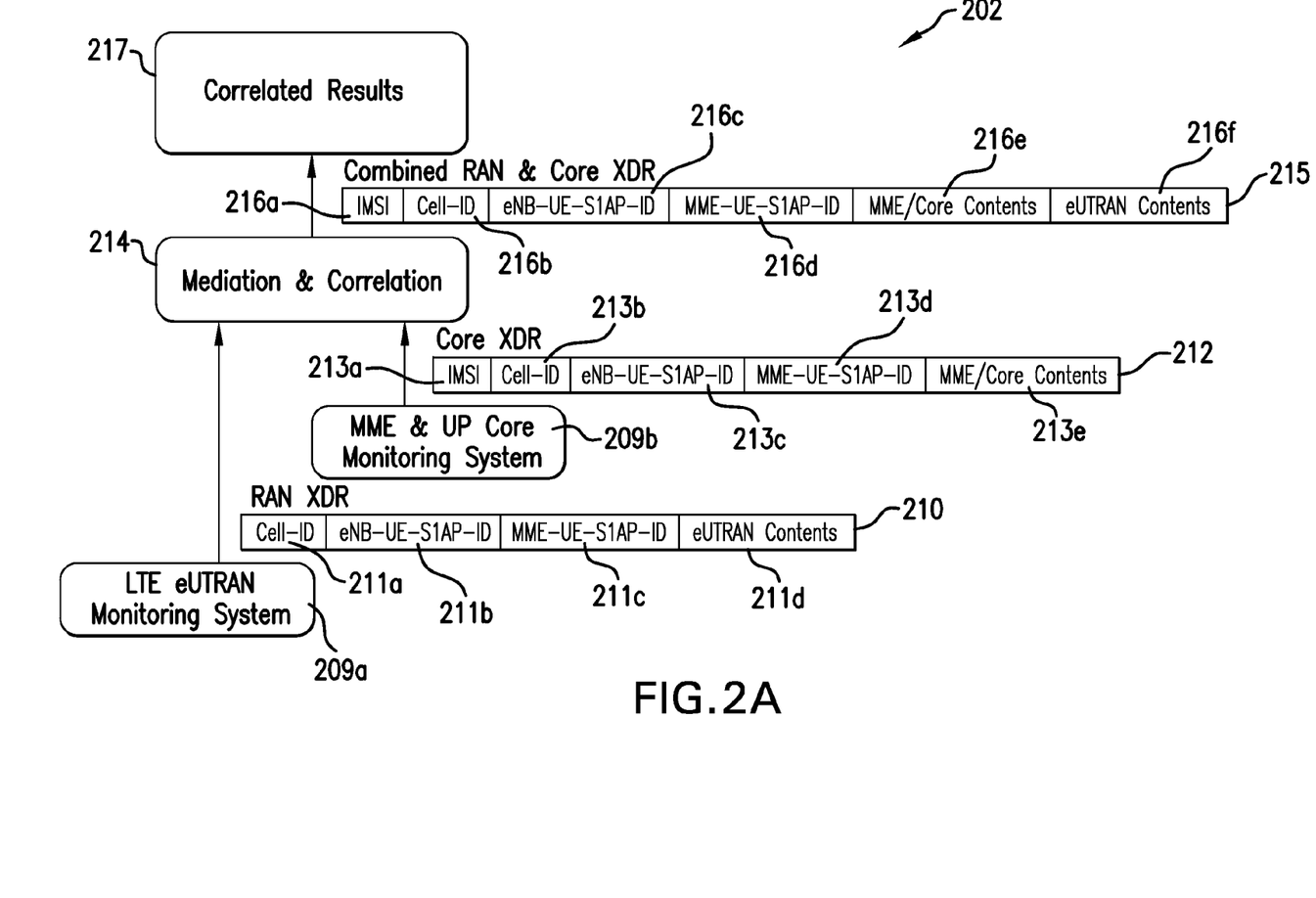
FIG. 2A is a block diagram/flow diagram detailing a portion of the process of FIG. 2.

Referring now to FIG. 2A, step S3 is further detailed in a block diagram/flow diagram 202 related to step S3 of the process 200 of FIG. 2. A LTE eUTRAN monitoring portion 209*a* of the monitoring system 109 collects the user plane traffic data as described above to create a user plane record 210. The user plane record 210 has four fields 211*a-d*. A MME &UP Core monitoring portion 209*b* of the monitoring system 109 collects the control plane signaling data as described above to create a control plane record 212. The control plane record 212 has five fields 213*a-e*, three of which (fields 213*b-d*) are the same as three fields (211*a-c*) of the user plane record 210. The monitoring system 109 mediates and correlates the records 210, 212 as shown in block 214 to create correlated results shown in block 217. The correlated results are a correlated record 215 having six fields 216*a-f*. It is envisioned that the monitoring occurs on an individual basis. However, because of the geolocation information, the individual data can be aggregated on a location by location basis to provide the displays described below with respect to FIGS. 4 and 5.

Figure 4:
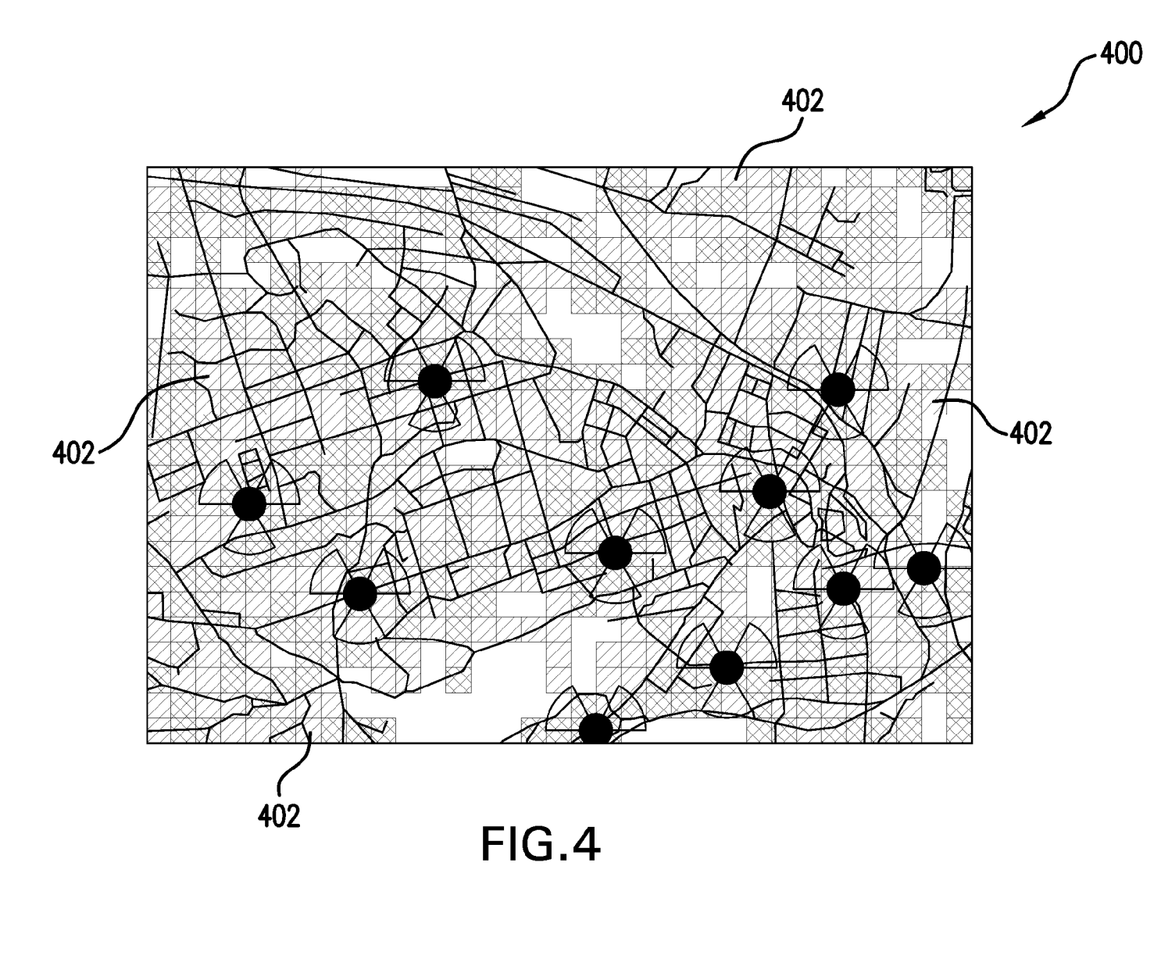
FIG. 4 is a heated tile map of the cell of FIG. 3 in accordance with the subject disclosure.

Still referring to FIG. 2, at step S4, the interface station 110 queries the monitoring system 109 to display any of a number of advantageous displays for review by the LTE network operator. One type of display is a color-coded or heated tile map 400 as shown in FIG. 400. Heated tile map 400 is user service quality as a function of geographic position in the cell 300 of FIG. 3. The cell 300 is divided into a plurality of squares or tiles 402. Each tile 402 may represent a single quality parameter or a plurality of aggregated quality parameters. The color of each tile indicates the quality such as dark red being the worst, faint pink being slightly below average, white being average, light green being above average, and dark green being the best with a varying spectrum of green to white to red colors in between. In one embodiment, the tiles 402 are 50 by 50 meters. Any color scheme to illustrate the relative performance of the tiles 402 may be used.

Multiple tile maps 400 for various parameters for the same cell 300 may be displayed simultaneously on the interface station 110. For example, tile maps showing user service quality, radio quality, and resource allocation parameters can all be displayed to allow the LTE network operator to evaluate operational parameters. Preferably, the maps or other results calculated and displayed include QoS, accessibility, and retainability at the call and packet level to allow optimizing each cell by at least these three parameters.

Figure 5:
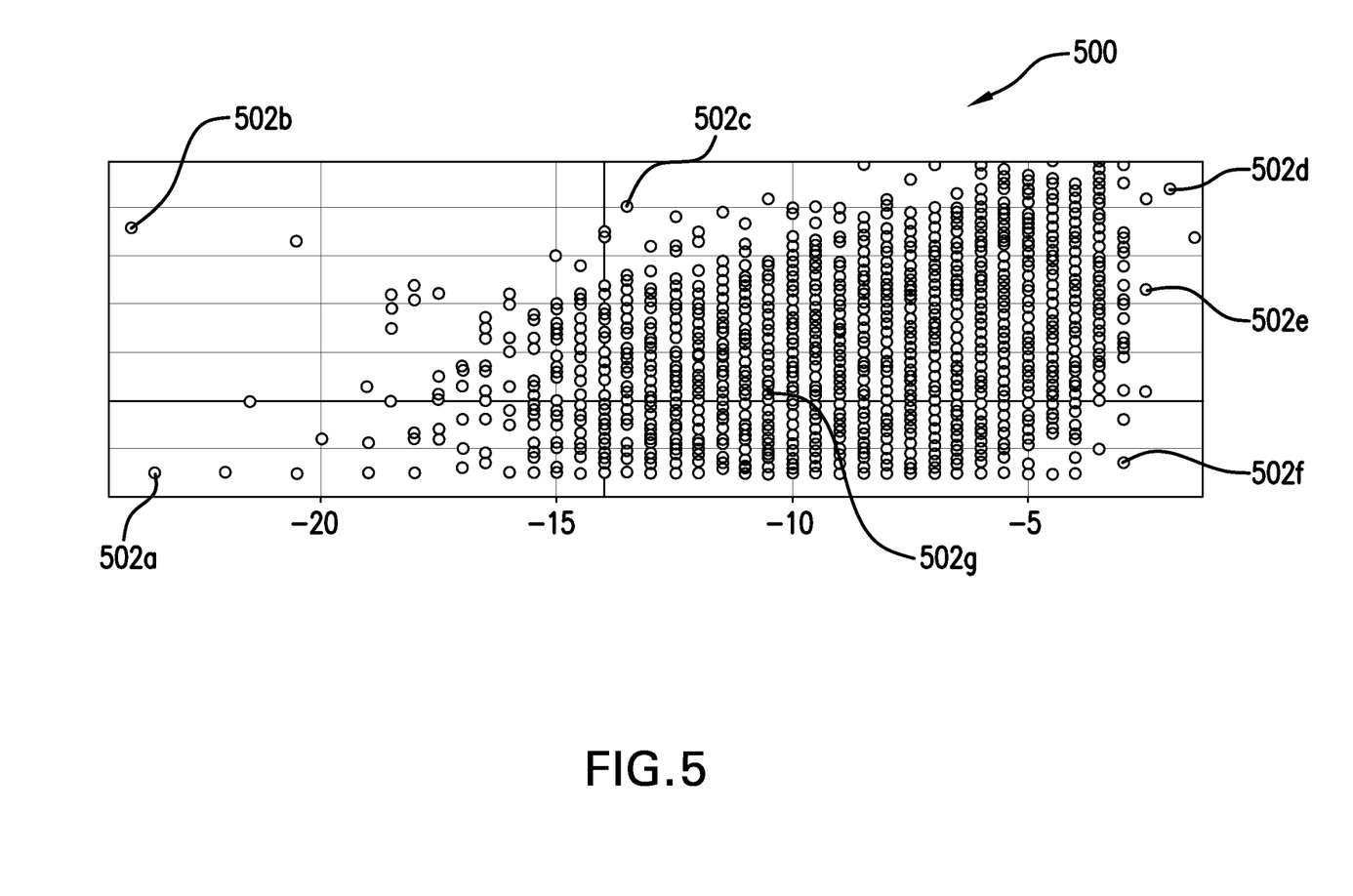
FIG. 5 is a scatter diagram for a cell in a mobile radio network in accordance with the subject disclosure.

Still referring to FIG. 2, at step S4, alternative or additional displays may be provided to the LTE network operator such as the scatter diagram 500 for the cell 300 shown in FIG. 5. The scatter diagram 500 is an analysis of user service quality as a function of radio interference within the cell 300. Each dot 502 in the scatter diagram 500 indicates a single user transaction/data connection with: the position on the Y or vertical axis indicating user service quality (higher values being better values); the position on the X or horizontal axis indicating the radio signal quality or interference (higher values being better signal quality or less interference); and the color of the dots indicating a density of overlaying dots. Thus, dot 502a would indicate a much poorer data point than dot 502d and dot 502g would indicate a somewhat typical data point as the density and grouping is significantly more increased. It is also envisioned that the color of the dots 502 could alternatively indicate another quality parameter instead of density. Upon review of one or more scatter diagrams, the LTE network operator can effectively adjust configuration and/or operation of the cell 300 to optimize performance without a drive test etc.

Still referring to FIG. 2, the process 200 continues to step S5 for optimization of the LTE network 100. By review and evaluation of the performance characteristics at step S4, the LTE network operator may adjust the configuration and operation of the LTE network 100. For example, antenna and power parameters can be adjusted for optimal performance based on the graphical displays of FIGS. 4 and 5. After the operational parameters are adjusted, the process 200 may be repeated to verify the operational efficiency has been improved and/or optimized.

As can be seen from the above, the subject technology provides new advantageous functions. The displays of steps S4 and S5 of FIG. 2 also can present a large quantity of data for visual review and corrective action. Displaying geographically the user-perceived quality distribution within the footprint of a cell allows deploying resources in the best manner to optimize user-perceived quality. Creating a geographical relation of radio quality and resource allocation information with user quality information also provides the LTE network operator the ability to effectively operate the LTE network.

User service quality information on an individual subscriber or aggregated basis can be displayed at the interface station 110 or other desired terminal. The user service quality can be presented in a plurality of different formats including as a function of: distance from the base station antenna; radio interference; signal strength; radio resource allocation (e.g., load in a cell); number of users in one cell; subscriber mobility; and/or combinations thereof. The displays can also present parameters such as profitability, which would allow the network operator to deploy adequate resources to highly profitable areas. Additionally, the type of activity within the cell can be displayed in order to further optimize performance and profitability.

The subject technology allows mobile network operators to reduce the need for drive testing significantly if not altogether. Analysis of service quality in direct relation to radio condition assessment is possible without a drive test. Further, the analysis and displays are available in real time as the available data can be quickly correlated and displayed without having to schedule a campaign or drive test. As such, the mean-time-to-resolution (MTTR) for identified problems will be greatly reduced. Still further, the results are statistically relevant because the basis is actual data unlike the results from drive testing.

As would be appreciated by those of ordinary skill in the pertinent art, the subject technology is applicable to use in many types of networks such as any mobile radio network or geographically distributed network of any type.

As used herein, networks, nodes, modules and various components are functional aspects of the disclosed embodiments, which may include software and/or hardware. Typically, such components encompass the necessary software and hardware to accomplish a task. It is envisioned that the same hardware could implement a plurality of modules with portions of such hardware being available as needed to accomplish the task. Those of ordinary skill will recognize that the software and various processes discussed herein are merely exemplary of the functionality performed by the disclosed technology and thus such processes and/or their equivalents may be implemented in commercial embodiments in various combinations without materially affecting the operation of the disclosed technology.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., probes, routers, nodes, modules, databases, interfaces, computers, servers and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A method for analyzing a mobile radio network comprising the steps of:
  collecting user plane traffic data from call monitoring equipment connected to the mobile radio network;
  collecting control plane signaling data from network monitoring equipment connected to the mobile radio network;
  correlating the user plane traffic data and the control plane signaling data related to a cell of the mobile radio network including IMSI, Cell-ID, eNB-UE-S1 AP-ID, MME/Core contents and eUTRAN Contents; and creating a graphical display of the correlated user plane traffic data and the control plane signaling data, wherein the graphical display is a color coded tile heat map of the cell comprising a plurality of color coded tiles in the cell and wherein each of the plurality of color coded tiles illustrates one of a plurality of Quality of Service (QoS) parameters for the cell selected from the group consisting of accessibility, retainability, profitability, call density and combinations thereof.

2. A method as recited in claim 1, further comprising the step of optimizing performance within the cell based upon the graphical display by adjusting antenna and power parameters.

3. A method as recited in claim 1, wherein the mobile radio network is a Long Term Evolution (LTE) network.

4. A method as recited in claim 1, wherein the graphical display illustrates profitability of the cell.

5. A method as recited in claim 1, wherein the user plane traffic data is individual call data that has been aggregated based on geolocation.

6. A cell network monitoring system coupled to a mobile radio network having at least one cell comprising:
 a monitoring device for: receiving user plane traffic data from call monitoring equipment connected to the mobile radio network; receiving control plane signaling data from network monitoring equipment connected to the mobile radio network; correlating the user plane traffic data and the control plane signaling data related to a cell of the mobile radio network including IMSI, Cell-ID, eNB-UE-S1 AP-ID, MME/Core contents and eUTRAN Contents; and creating a graphical display of the correlated user plane traffic data and the control plane signaling data, wherein the graphical display is a color coded tile heat map of the cell comprising a plurality of color coded tiles in the cell and wherein each of the plurality of color coded tiles illustrates one of a plurality of Quality of Service (QoS) parameters for the cell selected from the group consisting of accessibility, retainability, profitability, call density and combinations thereof.

7. A cell network monitoring system as recited in claim 6, further comprising a user interface station for presenting the graphical display, persistent memory for storing the user plane traffic data and the control plane signaling data, and the mobile radio network comprising a Long Term Evolution (LTE) network.

8. A cell network monitoring system as recited in claim 6, further comprising adjustment equipment connected to the mobile radio network for optimizing performance within the at least one cell based upon the correlated user plane traffic and control plane signaling data.

9. A cell network monitoring system as recited in claim 6, wherein the user plane traffic data is individual call data that has been aggregated based on geolocation.

10. A method for analyzing a Long Term Evolution (LTE) radio network, the method comprising the steps of:
 collecting user plane traffic data from call monitoring equipment connected to the LTE radio network;
 collecting control plane signaling data from network monitoring equipment connected to the LTE radio network; and
 correlating the user plane traffic data and the control plane signaling data related to a cell of the LTE radio network including IMSI, Cell-ID, eNB-UE-S1 AP-ID, MME/Core contents and eUTRAN Contents; and
 creating a graphical display of the correlated user plane traffic data and the control plane signaling data, wherein the graphical display is a color coded tile heat map of the cell comprising a plurality of color coded tiles in the cell and wherein each of the plurality of color coded tiles illustrates one of a plurality of Quality of Service (QoS) parameters for the cell of the LTE radio network, the parameters selected from the group consisting of accessibility, retainability, profitability, call density and combinations thereof.

* * * * *